March 18, 1969     H. E. REUSSER     3,433,280
LOCKNUT
Filed July 20, 1966
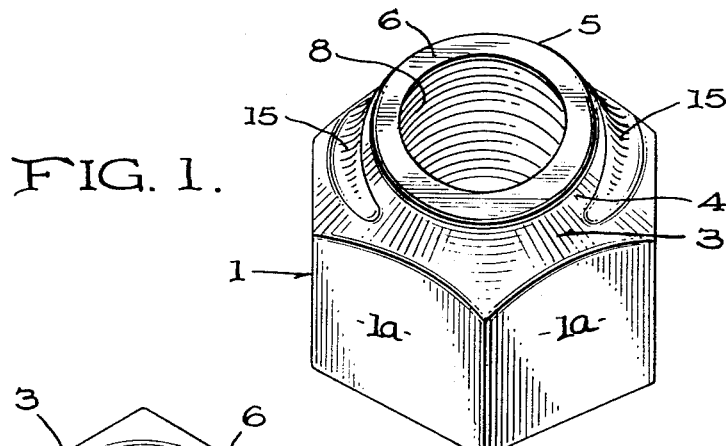
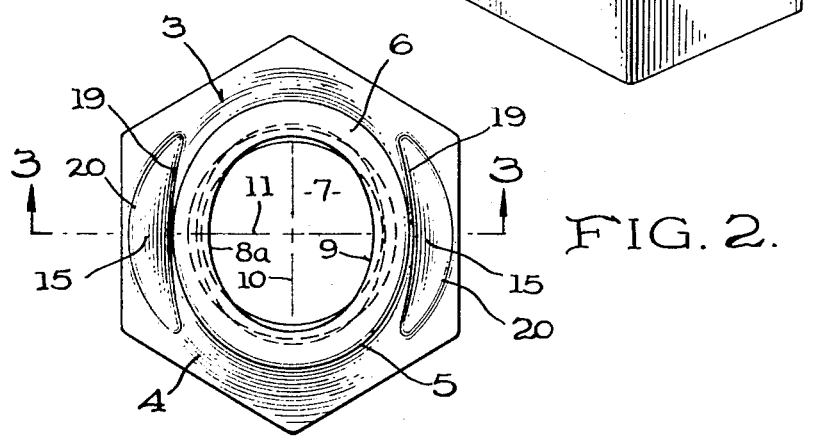
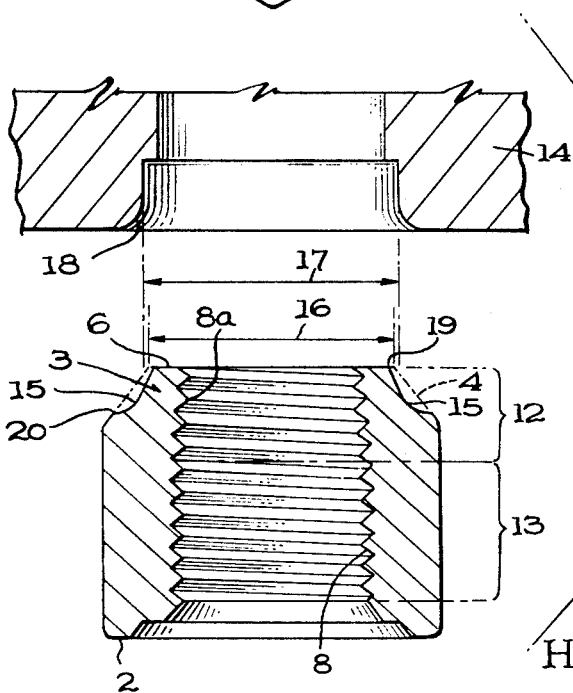
INVENTOR
HANS E. REUSSER
BY
ATTORNEY

United States Patent Office 3,433,280
Patented Mar. 18, 1969

3,433,280
LOCKNUT
Hans E. Reusser, Cleveland, Ohio, assignor to Republic Steel Corporation, Cleveland, Ohio, a corporation of New Jersey
Filed July 20, 1966, Ser. No. 566,562
U.S. Cl. 151—21                4 Claims
Int. Cl. F16b *39/28, 39/02;* B21d *53/20*

ABSTRACT OF THE DISCLOSURE

A prevailing torque locknut having a nondeformed sidewall, a frustoconical crown and a planar end face. Displaced threads are formed by a plurality of crescent-shaped indentations provided within the confines of the crown.

---

This invention relates generally to locknuts and more particularly to an improved prevailing torque locknut of the cold-formed type.

In the present type of locknut an impressing tool is utilized to produce, under controlled axial pressure, a uniform inward thread displacement to provide a locking action to a portion of the tapped bore of the nut. It has been found that this type of plastic working of the metal body of the nut by an impression die serves to set, in a uniformly repeating manner, the displaced thread portions of the tapped bore, in a manner which eliminates erratic springback that is a common result encountered when other means such as pinching are used to distort a nut blank. The present invention results in a torque resistance that is far more effective and consistent than that available with prior forms of locknuts. Experience has indicated that these other forms either have a low torque resistance with high flexibility, or a rapid loss in higher torque values following repeated application of the locknut due to excessively rigid or localized thread deformation.

Incipient with the design of this locking fastener is the consideration that from the bottom face, which is the intended surface of application, the majority of the internal thread offers a free-running fit with the mating male member. Because of this free engagement condition, there is no threat of cocking or deforming the threads of the mating parts and defeating the purpose of the joint as a reapplicable, non-destructive, locking fastener. By providing the locknut with angularly displaced portions in the nut thread, the mating screw member may be firmly seated in the free-starting portions of the nut threads in the axial direction of nut assembly so that the nut will be positively positioned anywhere on the screw member regardless of the thrust loads.

Accordingly, one of the primary objects of the present invention is to provide a locknut of the prevailing torque type having a crown portion bearing a plurality of indentations each of which comprises a surface of compound curvature such that the application of said indentations produces inwardly displaced thread portions in said locknut without any alteration of the lateral surfaces of the nut body.

Another object of the present invention is to provide a locknut having a nondeformed main body portion and including a crown having a plurality of indentations entirely contained within the periphery of the crown.

A further object of the present invention is to provide a locknut including a smooth surfaced upper end face and a frustoconical upper body portion provided with a plurality of crescent indentations therein providing inwardly deformed threads extending axially from the end face into the main body of the nut below the upper body portion.

With these and other objects in view which will more readily appear as the nature of the invention is better understood, the invention consists in the novel construction, combination and arrangement of parts hereinafter more fully described, illustrated and claimed.

A preferred and practical embodiment of the invention is shown in the accompanying drawing in which:

FIGURE 1 is a top perspective view of a locknut according to the present invention.

FIGURE 2 is a top plan view of the locknut according to the present invention.

FIGURE 3 is a vertical sectional view taken along the line 3—3 of FIGURE 2 and includes a suitable impressing tool as may be used to produce the locknut of the present invention.

Similar reference characters designate corresponding parts throughout the several figures of the drawing.

Referring now to the drawing, the present invention will be seen to comprise a locknut including a main body, generally designated 1, which may be of any polysided configuration or even cylindrical, it being for most purposes understood that at least two oppositely disposed lateral surfaces 1a should be parallel in order to facilitate application of the locknut by conventional wrenching apparatus. The bottom end face 2 serves as the usual bearing surface upon application of the nut while the upper portion includes a crown generally designated 3 which is basically a truncated conical extension of the main body 1. Prior to the impressing operation, the peripheral surface 4 of the crown 3 is a perfectly smooth and continuous frustoconical or tapered surface occupying the inclined plane indicated by the broken line 4 in FIGURE 3 and extending from the upper edges of each of the lateral surfaces 1a of the body 1 upwardly to the circular outer peripheral surface 5 of the planar upper end face 6.

As will be seen in FIGURE 2, the nut body is provided with the usual axial bore 7 provided with any suitable threads 8 as required.

The deformed threads of the locknut are readily apparent in FIGURE 2 wherein it will be seen that the circumference of the tapped bore 7 in the area immediately adjacent the upper end face 6 defines an ellipse 9 having the major axis 10 and minor axis 11. The inwardly deformed thread portions at the ends of the minor axis 11 which provide the locking action of the present invention are inclined inwardly towards the center axis of the bore 7 for a considerable distance below the juncture of the crown peripheral surface 4 and lateral surfaces 1a of the nut body 1 as indicated by the displaced thread height 12 in the sectional view of FIGURE 3. A bracket 13 in this view defines the free-running thread height.

The inward displacement of the thread portions is achieved by impressing the surface 4 of the crown 3 with a suitable tool such as the impressing die 14 whereby downward axial pressure upon the die 14 produces in the nut a plurality of indentations disposed entirely within the surface 4 and comprising crescent shaped dimples or intrusions 15. These indentations comprise a depressed surface having a compound curvature having obtuse intersecting edges so that a crescent configuration is provided which is concave towards the nut axis and has rounded tips. There are no flat surfaces or straight edges to the dimples 15 nor are any surfaces thereof concentric with the nut bore 7. By changing the length, width and depth of these indentations the amount of inward thread displacement and out of round distortion of the nut end face 6 may be altered. This is achieved by a change in the amount of force applied upon the impressing die 14.

An important feature of the present invention is that the indentations 15 are disposed entirely within the peripheral surface 4 of the crown 3 such that there is no deformation of the flat upper end face 6 or the lateral surfaces 1a of the nut body 1. This feature will be more readily understood by referring to FIGURE 3 wherein the original diameter of the circular outer peripheral surface 5 of the upper end face 6 is shown by the line 16 and the diameter of the innermost effective working area of the impressing die 14 is represented by the line 17, this lateral line being slightly longer than the line 16 so that upon application of pressure to the die 14 its working area designated 18 contacts only the inclined plane of the crown peripheral surface 4 to create the indentations 15 causing the inward displacement of the threads of the nut.

An excessively rigid or localized thread deformation is precluded by the provision of the above described indentations 15. Not only can various service requirements be met by altering the amount of pressure applied to the impressing tool 14 when generating the indentations 15 but, also, various torque values may be achieved by selecting the cone angle or degree of inclination of the crown surface 4 from the vertical, as well as the radial spacing of the indentations 15. A cone angle of 45° has been found to be satisfactory for most service requirements; however, any other cone angle may prove adequate for specific applications. With all other factors remaining equal it will be apparent that the thread-gripping resistance may be increased to a maximum level by providing three equispaced indentations instead of the two as illustrated in the drawing, the outstanding requirement being that the spacing, as well as the arrangement of each indentation itself defines a geometrical symmetric pattern.

Regardless of the depth of the indentations 15 as a result of the selected pressure as applied to the impressing die 14 or the number of indentations 15 provided in the crown portion of the locknut, the specific arrangement of each of the indentations 15 will be basically constant since it is these indentations that comprise one of the primary characteristics of the present invention to provide the improved deformed thread portions 8a.

Viewing FIGURE 2, it will be seen that the innermost edge of each arcuate indentation 15 comprises a primary arc of indentation curvature 19 as formed by the innermost portion of the working surface 18 of the impressing die 14. The radius of this innermost portion of the working surface 18 will be understood to be slightly larger than the nominal nut thread major diameter such that its radius will be greater than the radius of the contiguous surface of the conical surface 4. The outermost edge comprises a secondary arc of indentation curvature 20 and preferably has a radius at least equal to the distance from the outer edge of the indentation at its center to the inner tool opening and thus will be seen to have a shorter radius than the edge 19. Such an arrangement avoids the formation during impression of flat areas within the nut body of pure axial compression and possible distortion to the lateral surfaces 1a of the nut. As viewed in FIGURE 3, the vertical profile of the indentation 15 as it appears at its center portion at the ends of the bore minor axis 11, is that of a smooth continuous curve, the projected ends of which include an obtuse angle. It will be understood that should sufficient pressure be applied to the impressing die 14 to generate indentations 15 of suitable depth, that this angle of curvature may more closely approach an included angle of 90°.

Although illustrated as centrally disposed adjacent the lateral surfaces 1a, the indentations 15 may be impressed with their central portions in radial alignment with the intersecting edges of a pair of surfaces 1a.

What is claimed is:
1. A prevailing torque locknut, comprising, a main nut body having a lateral surface and a tapped bore, a crown portion extending upwardly from said main body and including a frustoconical surface intersecting at its lower edge with the top edge of said lateral surface and at its upper edge with a planar upper end face, a plurality of equispaced arcuate indentations impressed into said crown surface providing maximum inwardly deformed thread portions radially adjacent the center of said indentations and gradually diminishing deformed thread portions extending towards the points radially opposite the ends of said indentations whereby said bore adjacent said upper end face defines a smooth continuous curve, and the outer periphery of said upper end face likewise defines a smooth continuous curve, each of said indentations including a surface of compound curvature entirely contained within said crown between said upper end face and said lateral surface, said indentation surfaces substantially define a crescent shape in plan and are concave in vertical transverse section, said indentations including an innermost arcuate edge adjacent said upper end face and an outermost arcuate edge of a smaller radius adjacent said lateral surface, and the ends of said indentations provide a substantially smooth transition with the adjacent frustoconical surface.

2. A prevailing torque locknut, according to claim 1, wherein, said lateral surface defines a hexagonal nut body, and a pair of said indentations are diametrically disposed within said crown portion, whereby, said upper end face forms an ellipse having a minor axis juxtaposed the central portion of said indentations.

3. A prevailing torque locknut, according to claim 1, wherein, said lateral surface defines a hexagonal nut body having a plurality of flat surfaces, and each of said indentations is substantially as long as one of said flat surfaces.

4. A prevailing torque locknut, according to claim 1, wherein, said deformed thread portions axially extend from said upper end face to a point substantially below said crown portion and said lateral surface is nondeformed.

References Cited
UNITED STATES PATENTS

| 2,330,511 | 9/1943 | Money. |
| 3,208,494 | 9/1965 | Skidmore. |

FOREIGN PATENTS

| 10,396 | 8/1886 | Great Britain. |

EDWARD C. ALLEN, *Primary Examiner.*

U.S. Cl. X.R.

10—86